UNITED STATES PATENT OFFICE.

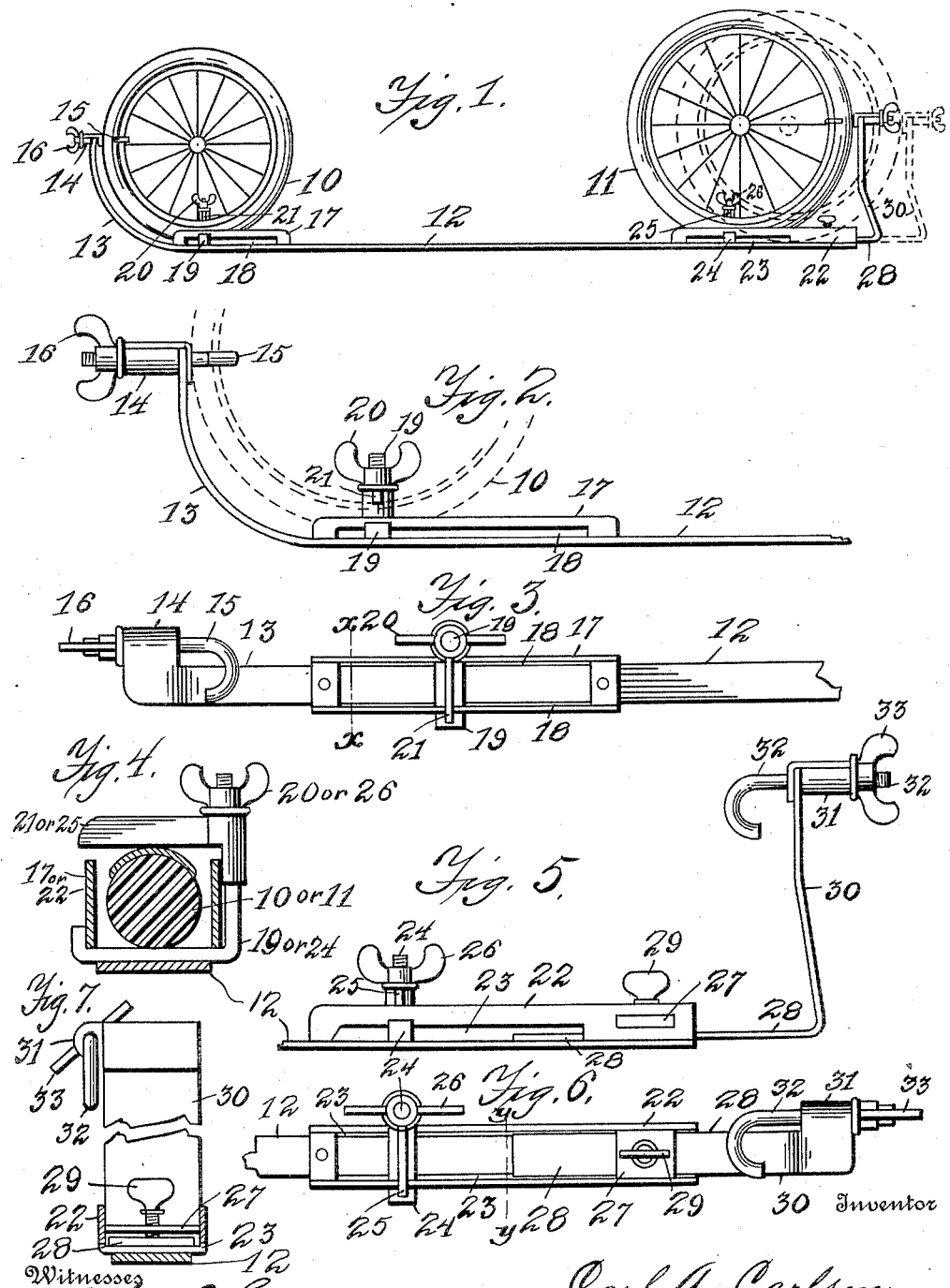

CARL A. CARLSON, OF JAMESTOWN, NEW YORK, ASSIGNOR, BY DIRECT AND MESNE ASSIGNMENTS, OF ONE-FIFTH TO A. FRANK NELSON, ONE-FIFTH TO EDWARD R. NELSON, ONE-FIFTH TO MARTIN DOLAN, AND ONE-FIFTH TO JOHN DOLAN.

DETACHABLE RUNNER FOR WHEELED VEHICLES.

1,076,816.  Specification of Letters Patent.  Patented Oct. 28, 1913.

Application filed September 16, 1912. Serial No. 720,476.

*To all whom it may concern:*

Be it known that I, CARL A. CARLSON, a citizen of the United States, residing at the city of Jamestown, in the county of Chautauqua and State of New York, have invented certain new and useful Improvements in Detachable Runners for Wheeled Vehicles, of which the following, taken in connection with the accompanying drawings, is a specification.

The invention relates to runners for wheeled vehicles and more particularly for baby carriages, and the object of the improvement is to provide a continuous runner which is firmly attachable and easily detachable to the two wheels on one side of a baby carriage, one runner to each side, and which is adjustable to different sized carriages, and the invention consists in the construction and combination of the parts as shown in this specification and the accompanying drawings and pointed out in the claims.

In the drawings, Figure 1 is a side elevation of the runner attached to the forward and rear wheels of a baby carriage and showing the adjustability of the attaching means for the rear wheel in dotted lines. Fig. 2 is an enlarged side elevation of the forward end of the runner showing the construction of the same, the wheel being shown in dotted outline; and Fig. 3 is a similarly enlarged plan view of the front portion of the runner as shown in Fig. 2; and Fig. 4 is a sectional view of the runner at line X X in Fig. 3 showing the construction and arrangement of the same. Fig. 5 is an enlarged side elevation of the rear end of the runner; and Fig. 6 is a plan view of the same; and Fig. 7 is a sectional view at line Y Y showing the arrangement of the parts.

Like numerals of reference refer to corresponding parts in the several views.

The numeral 10 designates the forward wheel and the numeral 11 the rear wheel of a vehicle or baby carriage.

The numeral 12 designates the runner which is bent upwardly at its forward end 13, which end 13 is turned at 14 with an eye therethrough to receive the hook 15 with its threaded end and thumb nut 16 to clamp it on the wheel rim. A channel piece 17 is attached to the upper side of the runner 12 at such a spaced distance from the turned up end 13 as to permit the wheel 10 entering between its sides and resting firmly upon the runner 12. The channel piece 17 has the slot 18 therethrough adjacent to the runner 12 to receive in said slot the angular clamping piece 19 with its thumb nut 20 and pivotally mounted arm or wing 21. The arm 21 extends across the inside of the rim of the wheel holding firmly upon the same, and the thumb nut 20 screws down onto the arm 21 to hold it in place, thereby pressing the rim of the wheel firmly upon the runner and against the turned up end, in conjunction with hook 15.

At the rear end of the runner a channel strip 22 is attached on the upper side of runner 12 and has a slot 23 therethrough adjacent to the runner 12 to receive a clamp 24 with an arm 25 and thumb nut 26, which are precisely similar to the clamp 19, and hold upon the rim of the rear wheel 11 in the same manner that the clamp 19 holds upon the rim of the front wheel 10. The channel strip 22 preferably extends to the rear end of runner 12 and a cross plate 27 is inserted in or attached to the sides of the channel strip 22 a spaced distance above the runner 12 to receive thereunder an angular extension strip 28. A thumb screw 29 is provided in plate 27 to firmly hold the extension strip 28 at different positions, the lower end of the thumb screw pressing the extension strip onto the runner 12 to hold it.

The extension strip 28 extends up at 30 to the rear side of the wheel 11 and is turned at 31 to form an eye which adjustably receives a hook 32 with thumb nut 33 thereon, the same as hook 15 with thumb nut 16 and the eye 14.

It is now apparent that a runner 12 with the extension strip 28 may be adjusted to the front and rear wheels at each side of the carriage and attached to said wheels by means of the hooks 15 and 32 and clamps 19 and 24, the extension strip 28 being adjusted and fastened securely in place by means of the thumb screw 29. The clamping arms 21 and 25 are turned to one side so that the wheels 10 and 11 are easily placed upon the sled runner and adjusted thereto. The hooks 15 and 32 are first secured to the rims of the wheels 10 and 11 after which the clamping arms 21 and 25 are turned into place and secured by the thumb nuts 20 and 26, thereby firmly holding the runner upon the two wheels. The runner may be quickly and easily detached from the wheels 10 and 11 by releasing the hooks 15 and 32 and the clamping arms 21 and 25.

The hooks 15 and 32 would hold the runner quite firmly in place upon the front and rear wheels without the clamps 19 and 24 and would serve a good purpose but the clamps 19 and 24 give added rigidity to the attachment of the wheels and to the entire vehicle so that the same may be easily propelled through the snow.

The construction provides a simple and convenient pair of runners which are continuous for each side of the vehicle and which may be quickly and easily attached or detached.

I claim as new—

1. A device of the class described comprising a continuous runner for the two wheels at one side of a vehicle, said runner having an upturned front end, a swivel hook slidably mounted in said front end for attaching the runner to the wheel rim of the front wheel in holding engagement, an extension slidably mounted on the upper side of the rear end of said runner and extending up behind the rear wheel, a thumb screw on said runner for holding said extension and a swivel hook slidably mounted in said extension for attaching to said rear wheel.

2. A device of the class described comprising a runner to extend along one side beneath the front and rear wheels, the front end of said runner extending upwardly and attached to the rim of the front wheel, an upwardly extending strip adjustably attached to the upper side of the rear end of said runner, the upwardly extending end of said strip attached to the rim of the rear wheel, channel strips attached to the upper side of said runner opposite the front and rear wheels to hold the same in place upon said runner, the sides of said channel strips having slots therein adjacent to said runner, and screw clamps in said slots in said channel strips having detachable arms to hold upon the rims of the front and rear wheels.

3. A device of the class described comprising a runner which extends beneath the front and rear wheels having an upturned front end, a hook pivotally mounted in said front end having a thumb nut to adjust the same upon the wheel rim, channel strips attached to the upper side of said front runner opposite the front and rear wheels, said channel strips having slots adjacent to said runner, clamps in said slots to engage over the wheel rim and hold the same, a plate in the rear channel strip a spaced distance above said runner and channel strips, an extension strip slidably mounted beneath said plate on said runner, a hook pivotally mounted in the upturned end of said extension strip and having a thumb nut thereon to hold said hook on the wheel rim, and a set screw in said plate in said channel strip to hold said strip in an adjusted position, substantially as and for the purpose specified.

In testimony whereof I affix my signature in the presence of two witnesses.

CARL A. CARLSON.

Witnesses:
H. A. SANDBERG,
ARTHUR O. MORSE.

Copies of this patent may be obtained for five cents each, by addressing the "Commissioner of Patents, Washington, D. C."